US008608888B2

(12) United States Patent
Odell et al.

(10) Patent No.: US 8,608,888 B2
(45) Date of Patent: Dec. 17, 2013

(54) METHOD AND APPARATUS FOR STRETCHING A LINER AND EVERTING THE LINER INTO A PIPE

(75) Inventors: Kelly Odell, Salem, OR (US); Pat J. Anderson, Salem, OR (US)

(73) Assignee: Michels Corporation, Brownsville, WI (US)

( * ) Notice: Subject to any disclaimer, the term of this patent is extended or adjusted under 35 U.S.C. 154(b) by 719 days.

(21) Appl. No.: 12/720,424

(22) Filed: Mar. 9, 2010

(65) Prior Publication Data
US 2011/0220273 A1 Sep. 15, 2011

(51) Int. Cl.
| | | |
|---|---|---|
| *E04B 2/00* | (2006.01) |
| *E04F 13/00* | (2006.01) |
| *B29C 73/00* | (2006.01) |
| *B29C 65/00* | (2006.01) |
| *B32B 43/00* | (2006.01) |
| *B32B 37/00* | (2006.01) |
| *F02F 1/06* | (2006.01) |

(52) U.S. Cl.
USPC ............... 156/229; 156/71; 156/94; 156/294; 156/303.1

(58) Field of Classification Search
USPC ........... 156/60, 70, 71, 94, 98, 148, 149, 160, 156/165, 166, 196, 199, 212, 229, 293, 294, 156/303.1, 307.1, 307.3, 307.4, 324, 349, 156/383, 423, 494, 538, 574
See application file for complete search history.

(56) References Cited

U.S. PATENT DOCUMENTS

| | | | |
|---|---|---|---|
| 4,135,958 A | 1/1979 | Wood | |
| 4,182,262 A | 1/1980 | Everson et al. | |
| 5,358,359 A | 10/1994 | Long, Jr. | |
| 5,374,174 A | 12/1994 | Long, Jr. | |
| 5,490,964 A * | 2/1996 | Kamiyama et al. | ........ 264/36.17 |
| 5,501,248 A | 3/1996 | Kiest, Jr. | |
| 5,700,110 A | 12/1997 | Kamiyama et al. | |
| 5,916,406 A | 6/1999 | Kamiyama et al. | |
| 6,054,180 A | 4/2000 | Kamiyama et al. | |
| 6,244,846 B1 | 6/2001 | Keller | |
| 6,390,795 B1 | 5/2002 | Waring et al. | |
| 6,539,979 B1 | 4/2003 | Driver | |
| 6,679,293 B2 | 1/2004 | Driver | |
| 6,899,832 B2 | 5/2005 | Wood | |

(Continued)

OTHER PUBLICATIONS

U.S. Appl. No. 60/638,402, filed Dec. 27, 2004, 12 pages.

*Primary Examiner* — Philip Tucker
*Assistant Examiner* — Brian R Slawski
(74) *Attorney, Agent, or Firm* — Michael Best & Friedrich LLP

(57) ABSTRACT

An apparatus for lining a pipe, comprising a liner having a non-everted portion and an everted portion, and a stretching device. The stretching device includes at least two stretch members secured to the everted portion on substantially opposing sides, and a force mechanism to facilitate movement of the stretch members away from each other in order to stretch the evert portion of the liner. Preferably, the liner comprises an inner layer and an outer layer, and the stretch members are positioned between the inner and outer layers. In another aspect, the present invention provides a method of everting a liner into a pipe. The method includes flipping an open end of the liner inside out to create an everted portion, engaging a sidewall of the liner at two opposing locations on the everted portion, and applying a force at the two locations to stretch the everted portion of the liner.

19 Claims, 9 Drawing Sheets

(56) References Cited

U.S. PATENT DOCUMENTS

| | | |
|---|---|---|
| 6,960,313 B2 | 11/2005 | Waring et al. |
| 6,969,216 B2 | 11/2005 | Driver |
| 7,108,456 B2 | 9/2006 | Driver et al. |
| 7,124,570 B2 | 10/2006 | Blatter et al. |
| 7,360,559 B2 | 4/2008 | Driver et al. |
| 7,476,348 B2 | 1/2009 | Waring |
| 7,517,212 B2 | 4/2009 | Blackmore et al. |
| 7,527,076 B2 | 5/2009 | Lepola et al. |
| 2007/0029688 A1* | 2/2007 | Delaney et al. ............ 264/36.15 |
| 2007/0114689 A1 | 5/2007 | Driver et al. |

* cited by examiner

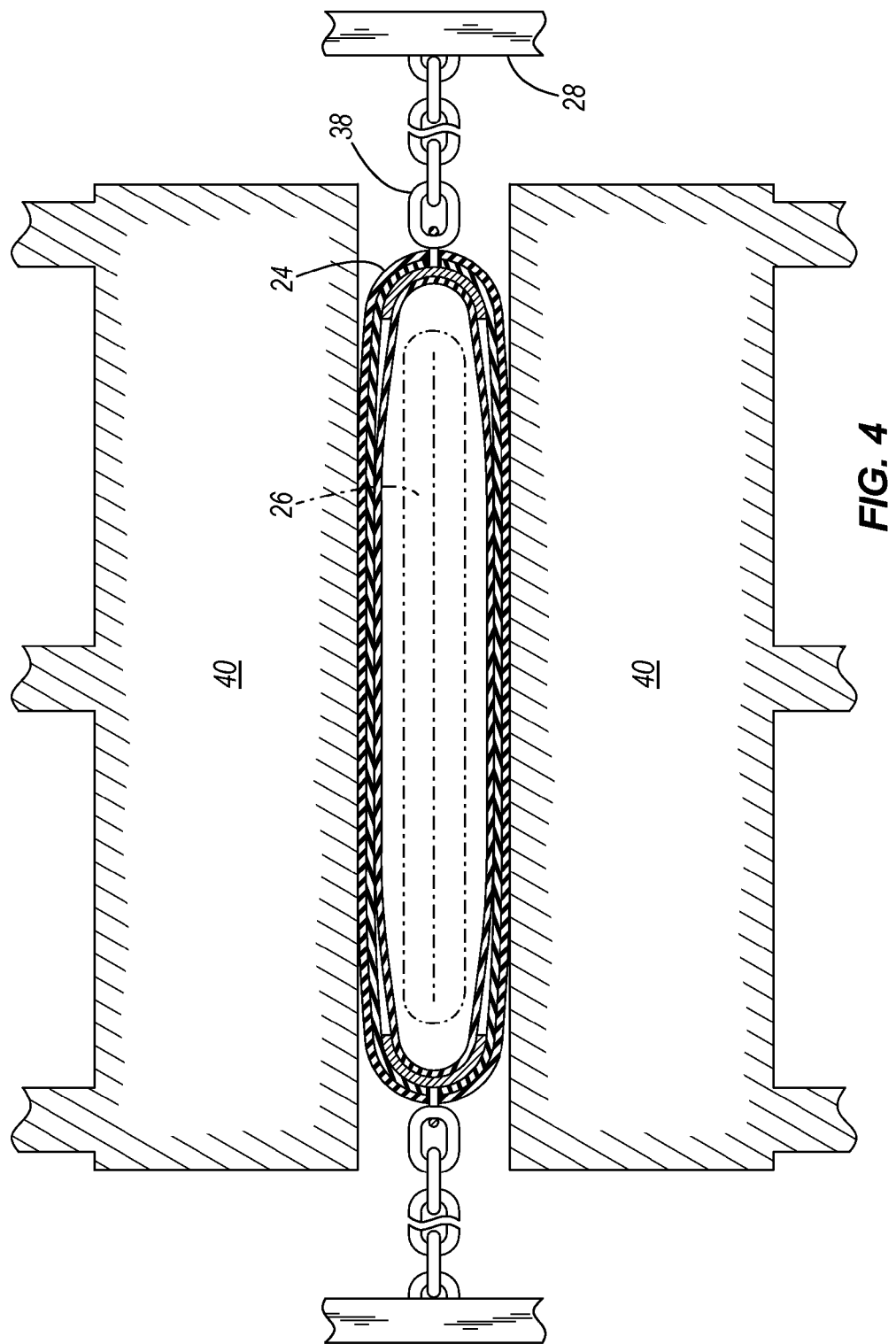

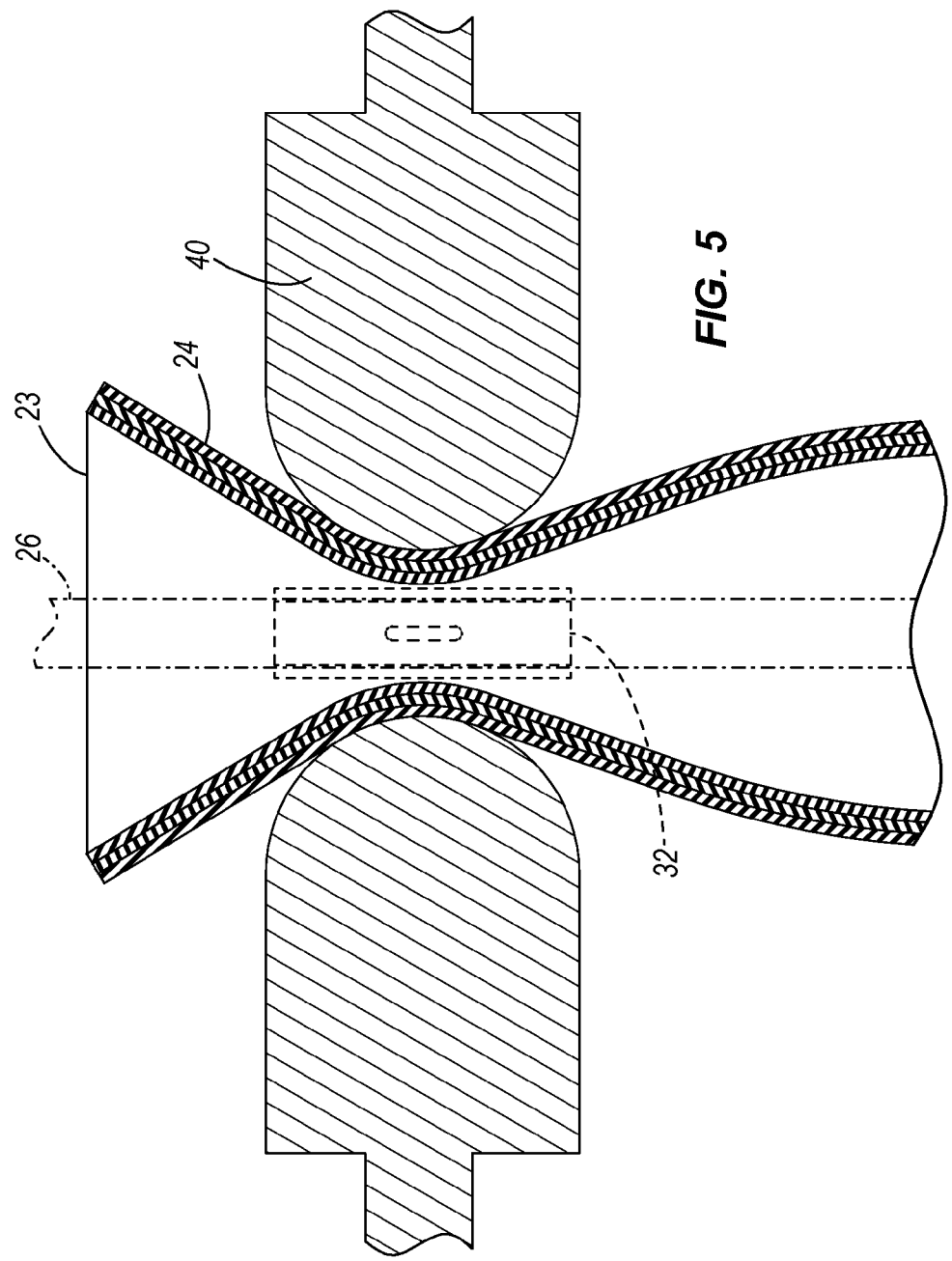

METHOD AND APPARATUS FOR STRETCHING A LINER AND EVERTING THE LINER INTO A PIPE

BACKGROUND

The present invention relates to the rehabilitation of underground pipelines, and more specifically to everting liners into pipelines, such as sewer pipes.

There are several options for dealing with a failed underground pipeline. One option is to dig up the old pipe and replace it with new pipe. Another option is to insert a liner into the pipe. Inserting a liner into a pipe can often be done without extensive digging, and thus is a desirable alternative to replacing the pipe.

It is known to line a pipe by everting a liner into the pipe. Everting is accomplished using a specially-designed apparatus that inverts a liner and forces it into the pipe under fluid pressure. Everting apparatuses commonly include a rigid feeder tube that secures the end of the liner and provides a location for applying the pressure required to invert the liner into the pipe. One such everting apparatus is disclosed in U.S. Pat. No. 6,960,313, which is incorporated herein by reference in its entirety.

Another type of everting apparatus includes a flexible feeder made of a cloth material (e.g., similar to the material of the liner being everted). In this type of arrangement, the end of the liner is secured to the end of the flexible feeder, and a suitable pressure connector and gauge are firmly secured to the flexible feeder using bolts inserted through the sidewall of the feeder. A tube everting device like this is disclosed in U.S. Pat. No. 7,476,348, which is incorporated herein my reference in its entirety.

SUMMARY

The present invention provides an alternative approach to everting a liner into a pipe. More specifically, the present invention provides an apparatus for lining a pipe, comprising a liner having a non-everted portion and an everted portion, and a stretching device. The stretching device includes at least two stretch members secured to the everted portion on substantially opposing sides of the everted portion and movable relative to each other; and a force mechanism (e.g., comprising an elongated flexible member) secured to at least one of the stretch members to facilitate relative movement of the stretch members away from each other in order to stretch the evert portion of the liner. Preferably, the liner comprises an inner layer and an outer layer, and at least one of the stretch members is positioned between the inner and outer layers.

In one embodiment, at least one of the stretch members comprises a body portion (e.g., having a substantially frustocylindrical shape) positioned on an interior of the everted portion, and a connector portion extending at least partially through a portion of a sidewall of the liner.

In another aspect, the present invention provides a method of everting a liner into a pipe. The method includes flipping an open end of the liner inside out to create an everted portion, engaging a sidewall of the liner at two opposing locations on the everted portion, and applying a force at the two opposing locations to stretch the everted portion of the liner (e.g., by moving the two opposing locations away from each other).

In one embodiment of the inventive method, engaging a sidewall includes positioning a stretch member at least partially inside the sidewall of the everted portion at each of the two opposing locations (e.g., by creating a void between an inner layer and an outer layer at each of the two opposing locations and inserting at least a portion of each stretch member in the corresponding void). Preferably, applying a force includes moving the two stretch members away from each other.

Other aspects of the invention will become apparent by consideration of the detailed description and accompanying drawings.

BRIEF DESCRIPTION OF THE DRAWINGS

FIG. 4 is a section view taken along line 4-4 in FIG. 1.

FIG. 5 is section view taken normal to the sections in FIGS. 2 and 4.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
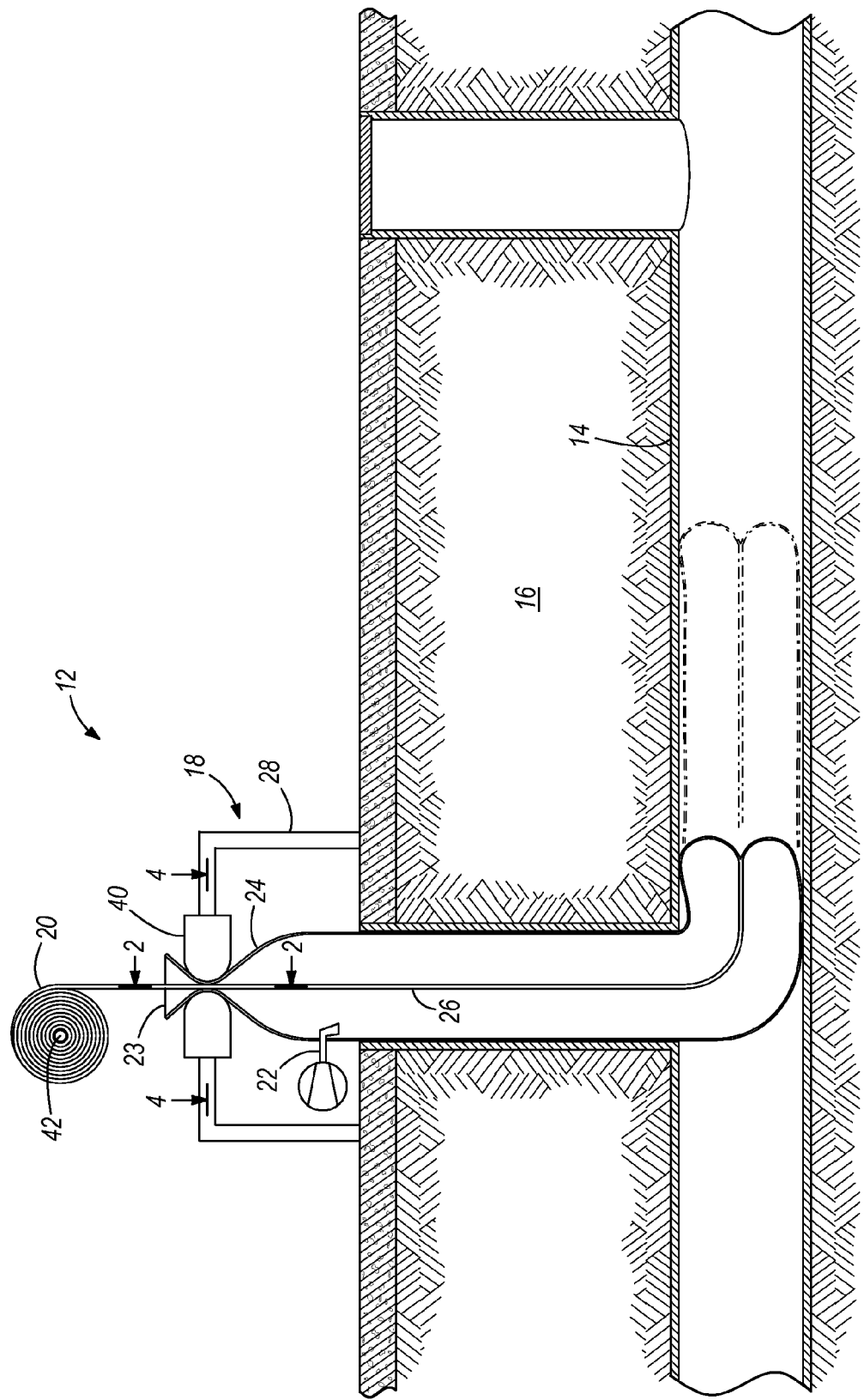
FIG. 1 is a side section view of an apparatus embodying the present invention.

FIG. 1 illustrates an apparatus 12 for lining a pipe 14 positioned in the ground 16. The apparatus generally includes a support structure 18, a liner 20 secured to the support structure, and a pressure connector 22 secured to the liner 20. As described below in more detail, this apparatus can be used to evert the liner 20 into the pipe. The liner 20 includes an open end 23 that is designed to be fed through an intake of the support structure and then inverted outwardly to create an everted portion 24 separate from a non-everted portion 26.

Figure 2:
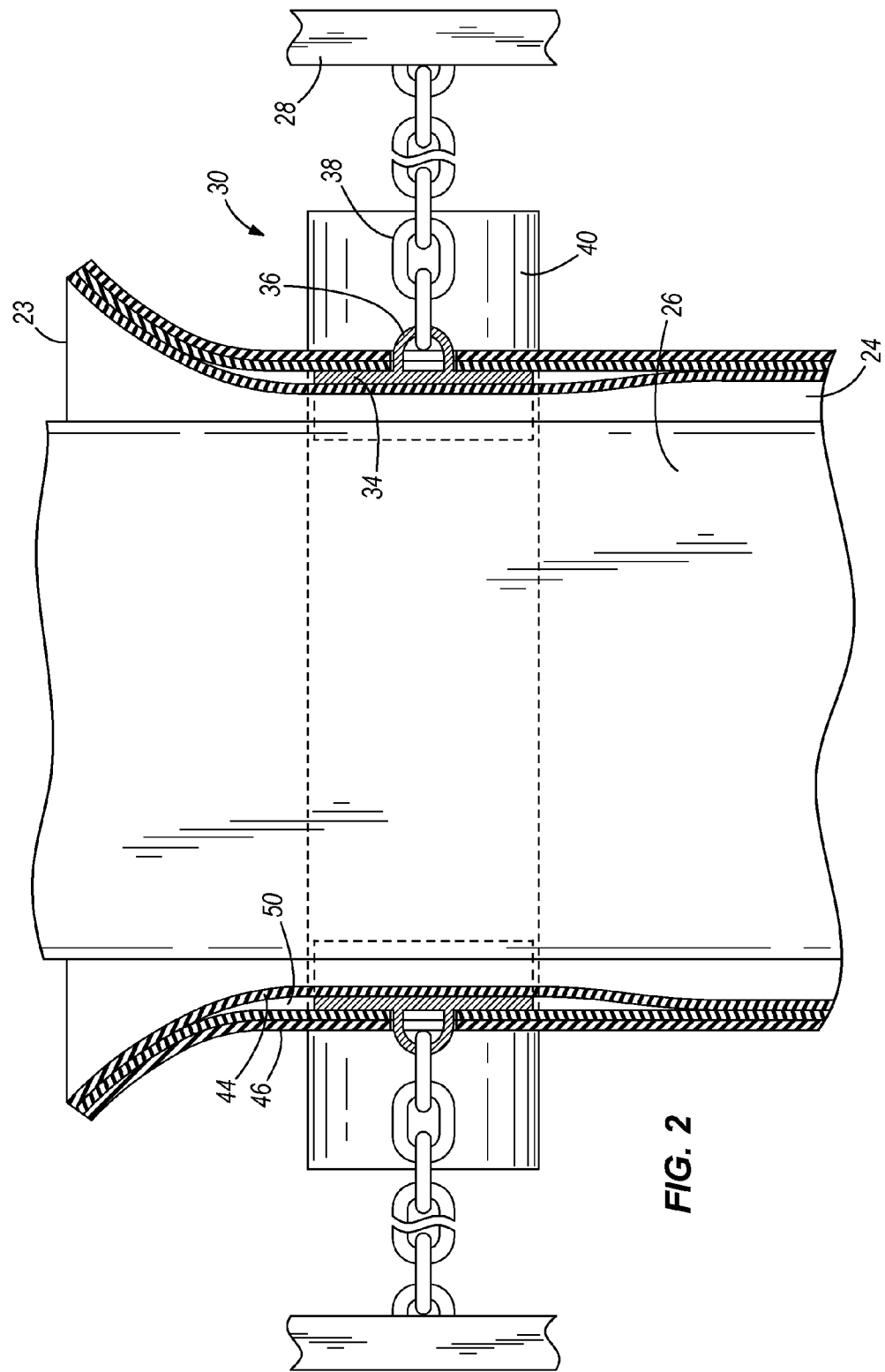
FIG. 2 is a section view taken along line 2-2 in FIG. 1.
Figure 3:
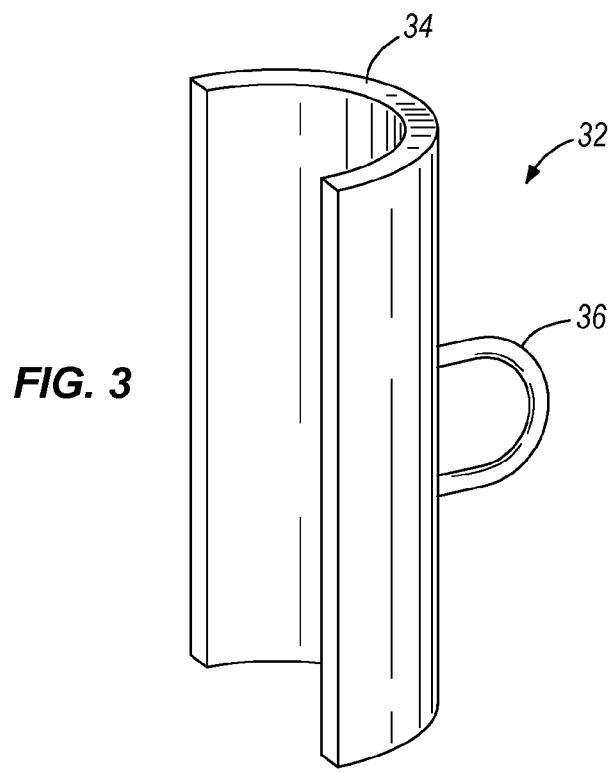
FIG. 3 is a perspective view of a stretch member.
Figure 10:
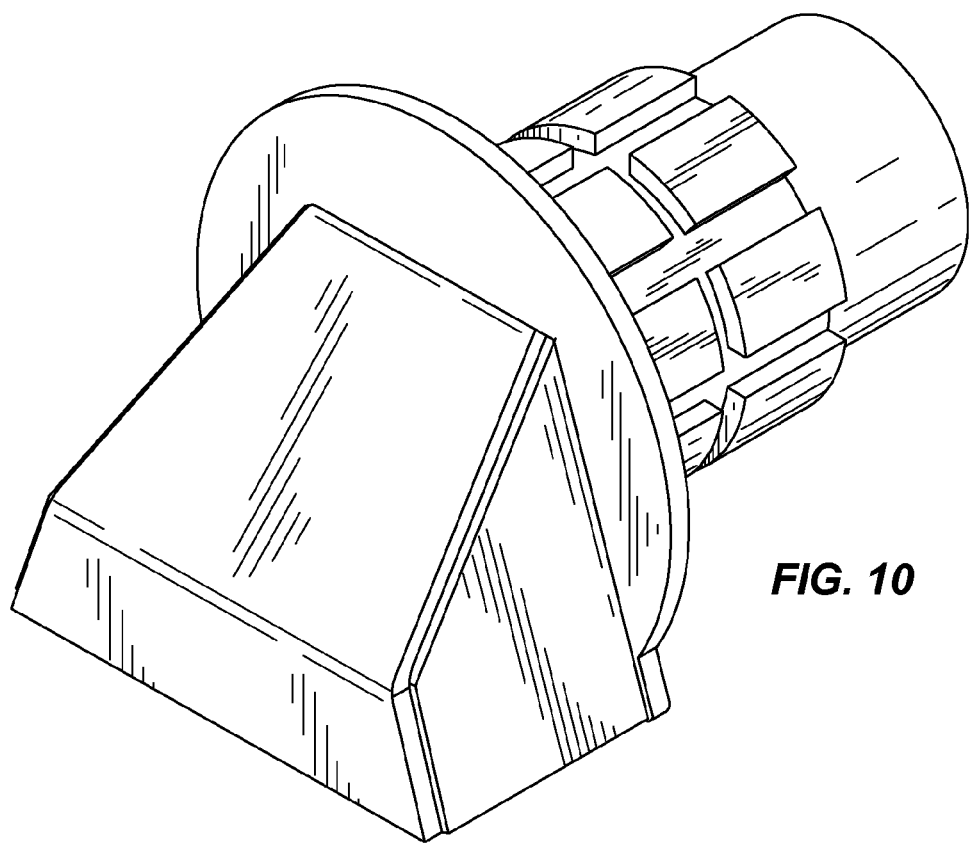
FIG. 10 is a front perspective view of a different pressure connector embodying aspects of the present invention.

Referring to FIG. 2, the illustrated support structure includes a frame 28 and a stretching device 30 supported by the frame 28. The illustrated stretching device 30 includes two stretch members 32, each comprising a body portion 34 and an engagement portion 36. Each illustrated body portion 34 comprises a frustocylindrical shape, which in the illustrated embodiment is a substantially semi-cylindrical member. Each illustrated engagement portion 36 is substantially U-shaped and is secured to a central part of the corresponding body portion 34. The stretching device 30 further includes a force mechanism that moves the stretch members 32 away from each other. The illustrated force mechanism comprises an elongated flexible member in the form of a chain 38 secured to each engagement portion 36. Force can then be applied to at least one of the chains 38 by any suitable means, such as with a hydraulic jack or mechanical come-along.

The illustrated support structure further includes pinchers 40 that pinch the everted portion 24 of the liner 20 in order to enhance the seal between the everted portion 24 of the liner 20 and the non-everted portion 26 of the liner 20 passing through. In the illustrated embodiment, the pinchers 40 comprise elongated cylindrical members positioned in spaced, parallel relationship on opposing sides of the stretch members 32. The pinchers 40 are designed to be movable relative to each other such that the spacing between the pinchers 40 can be adjusted in order to achieve a desired seal.

The liner 20 is an elongated, tubular-shaped member made of materials that are flexible. The liner 20 is provided in a flattened condition on a spool 42, as is known in the art. Liners for everting into an underground pipe are well known in the art, and the specifics of the liner 20 are not part of the present invention. Nevertheless, the illustrated liner 20 includes an inner layer 44 of polyurethane that is about 3 mm thick, and outer layers 46 of polyester felt that are about 6 mm thick. The outer layers 46 are formed and then the inner layer 44 is coated onto the outer layers 46 by a extrusion or hot bonding process. Liners that can be used to practice the present invention can be obtained from Applied Felts, Inc. of Martinsville, Va.

The open end of the liner 20, which is part of the everted portion 24, is secured to the stretching mechanism such that the open end of the liner 20 is forced into an almost completely flattened position. More specifically, the stretch members 32 are inserted at opposing sides of the liner 20 and are forced away from each other to thereby stretch the liner 20 and hold it in an opened, but slightly flattened position. In this position, the open end of the liner 20 is stretched slightly in order to facilitate movement of the non-everted portion 26 of the liner 20 through the open end.

Figure 6:
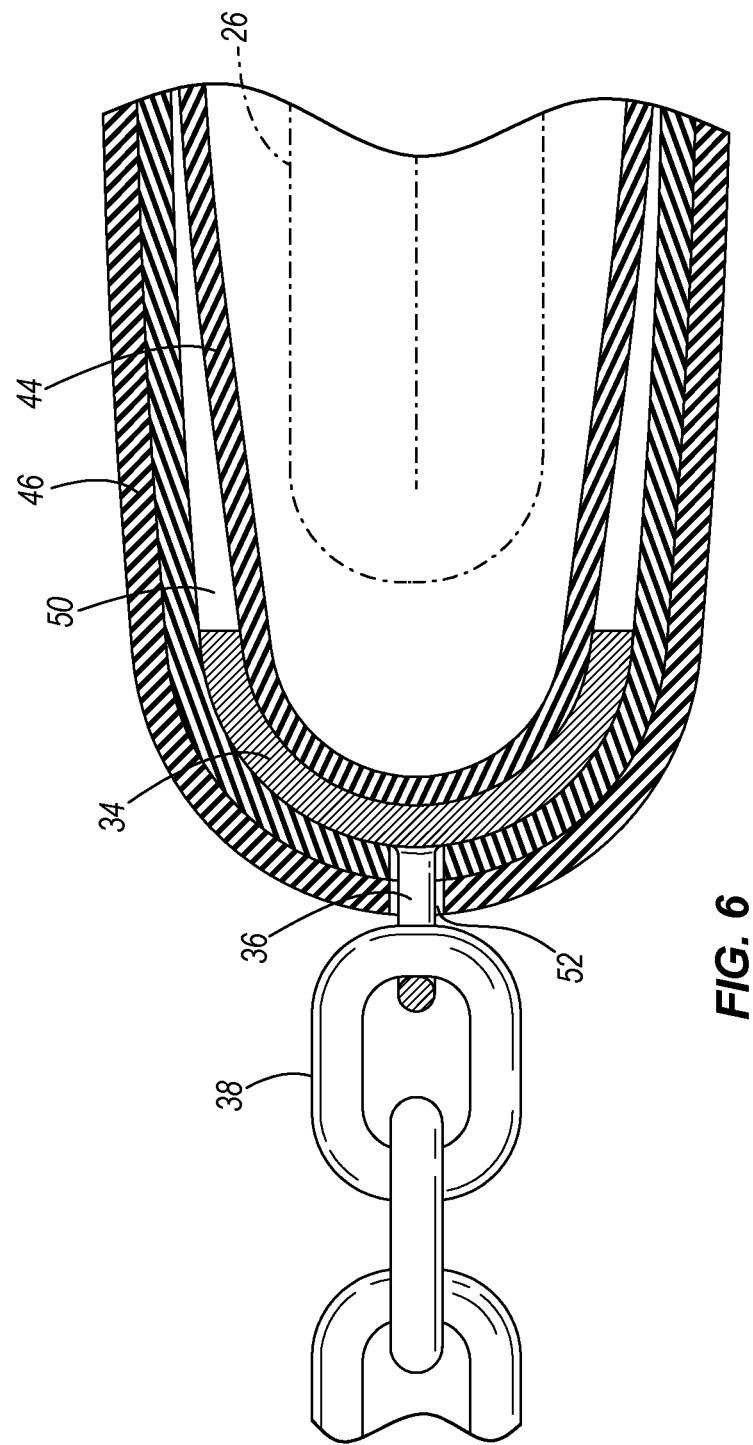
FIG. 6 is an enlarge section view of apportion of FIG. 4.
Figure 7:
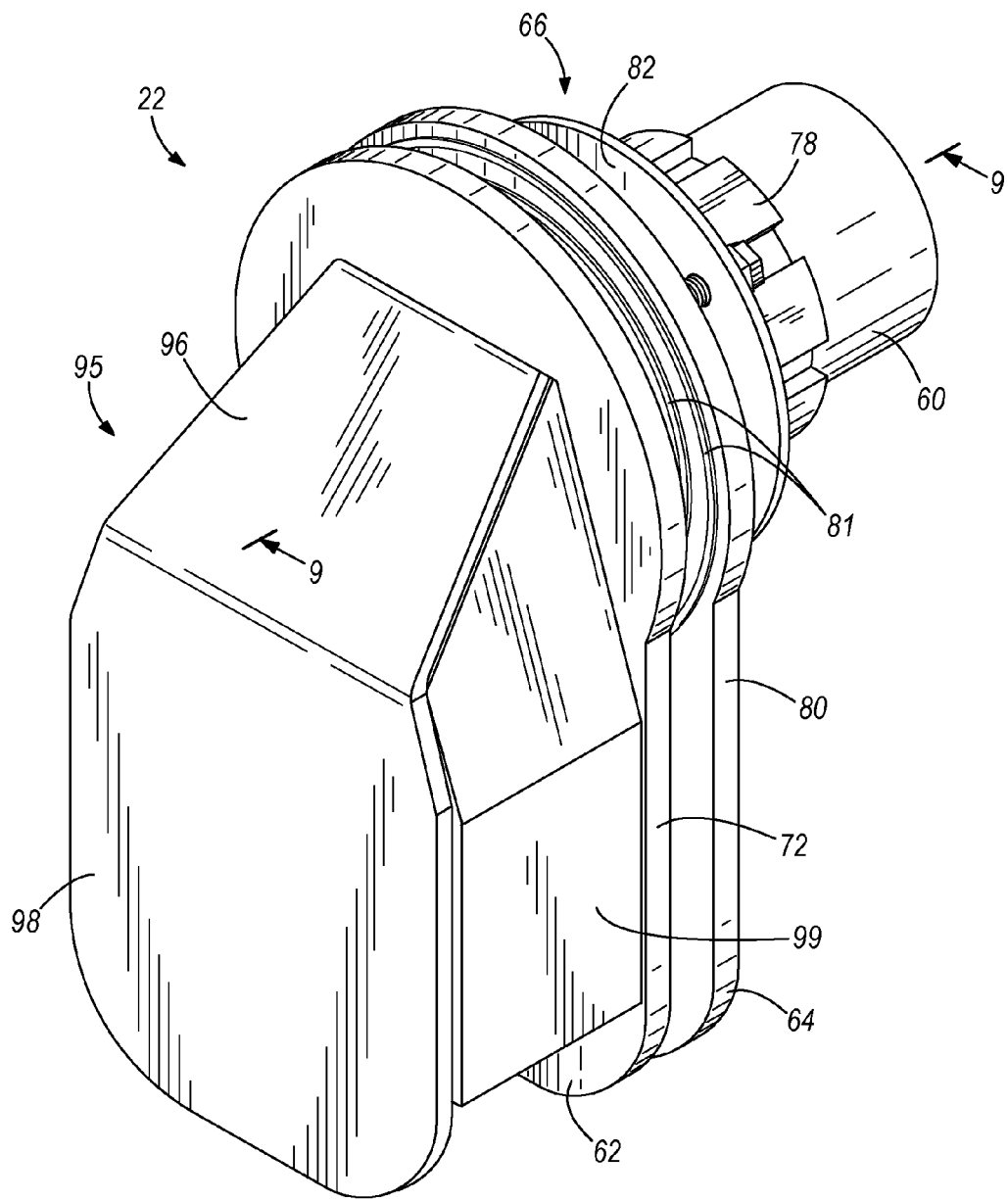
FIG. 7 is a front perspective view of a pressure connector embodying aspects of the present invention.
Figure 8:
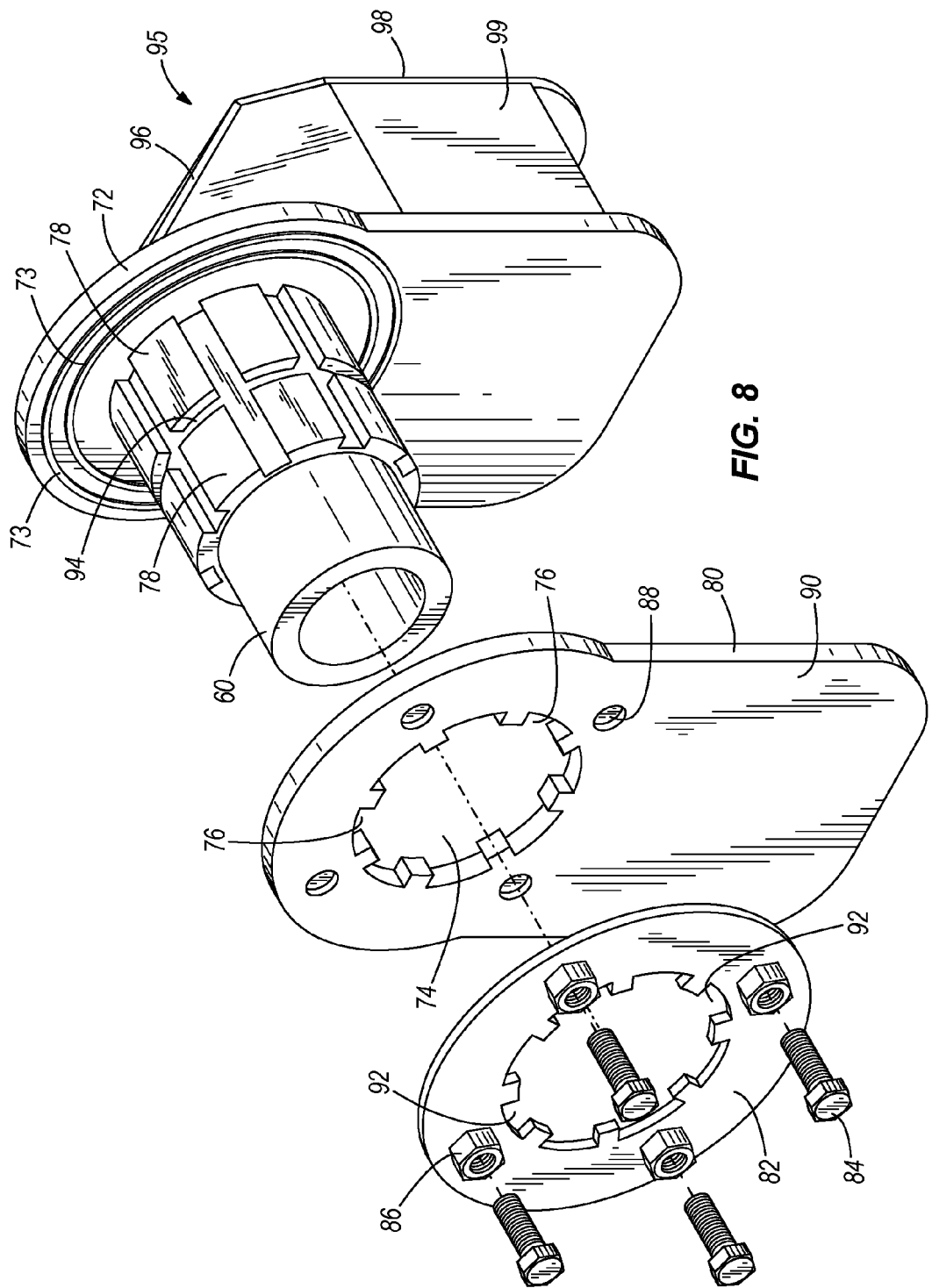
FIG. 8 is a rear exploded perspective view of the pressure connector if FIG. 2.

In the illustrated embodiment, each stretch tube is carefully positioned in the liner 20 to provide a secure engagement between the stretching mechanism and the liner 20. More specifically, each stretch tube is positioned in a void 50 between the inner layer 44 and the outer layers 46 of the liner 20. This is done by separating the inner layer 44 from the outer layers 46 to create a gap into which the stretch tube is positioned. In addition, a small opening 52 (FIG. 6) is created through the outer layers 46 to receive the engagement portion 36 of the stretch member 32 and facilitate the application of a force to the stretch member 32 via the engagement portions 36. In the illustrated embodiment, the force is applied through the chain 38 secured to the engagement portion 36.

The pressure connector 22 is secured to the everted portion 24 of the liner 20 in order to facilitate the introduction of pressurized fluid into the liner 20. The pressure connector 22 includes a connector stud 60, an inner pinch plate 62, an outer pinch plate 64, and a compression mechanism 66 positioned to force the outer pinch plate 64 toward the inner pinch plate 62.

Figure 9:
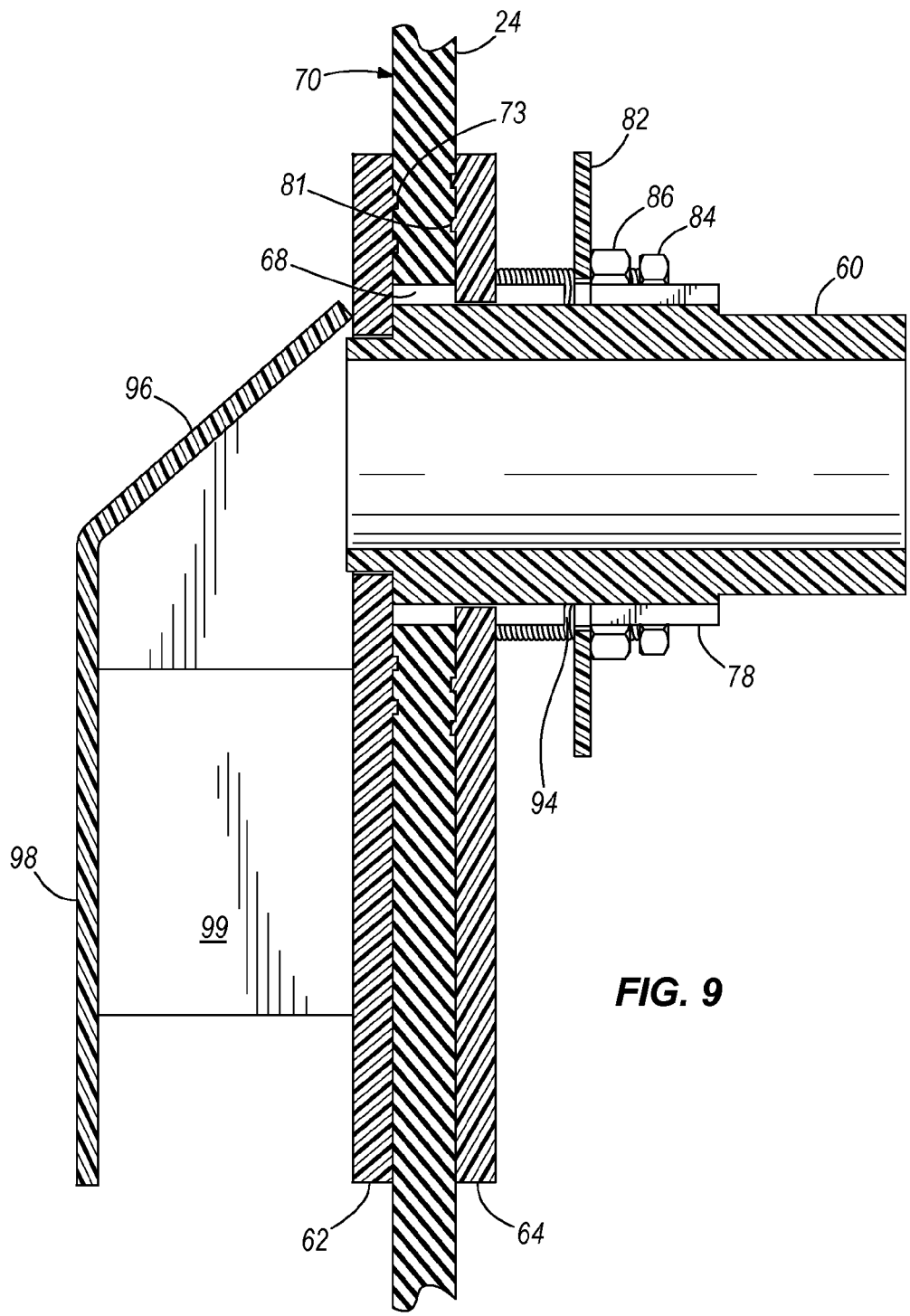
FIG. 9 is a section view taken along line 9-9 in FIG. 2.

The connector stud 60 is designed to be positioned through an opening 68 (FIG. 9) in the everted portion 24 of the liner 20. The inner pinch plate 62 is rigidly secured to an inner end of the connector stud 60, and the inner pinch plate 62 is designed to be positioned against an inner surface 70 of the everted portion 24 of the liner 20 with a majority of the connector stud 60 extending through the opening 68 and outside the liner 20. The inner pinch plate 62 has an outer periphery 72 that is shaped asymmetrically relative to the opening 68 in the liner 20, and a series of circumferential ridges 73.

The outer pinch plate 64 includes an orifice 74 that is dimensioned to receive and slide relative to the connector stud 60. More specifically, the outer pinch plate 64 includes a series of circumferentially-spaced grooves 76 that are dimensioned to receive corresponding splines 78 on the exterior surface of the connector stud 60 to thereby allow axial movement of the outer pinch plate 64 relative to the connector stud 60 and inner pinch plate 62. The outer periphery 80 of the outer pinch plate 64 is shaped substantially the same as the outer periphery of the inner pinch plate 62, and the grooves 76 and splines 78 maintain proper alignment of the inner and outer pinch plates 62,64. The outer pinch plate 64 further includes circumferential ridges 81 in opposed relation to the ridges 73 of the inner pinch plate 62.

The compression mechanism 66 includes a reaction plate 82 and a series of circumferentially-spaced bolts 84 threaded through the reaction plate 82. More specifically, the reaction plate 82 includes a series of circumferentially-spaced holes and a series of threaded nuts 86 welded in alignment with the holes. The bolts 84 are threaded into the nuts 86 such that the bolts 84 extend through the reaction plate 82. The bolts 84 are easily accessible from the outside of the liner 20 such that the bolts 84 can be rotated to adjust the length of the bolt extending beyond the reaction plate 82. The ends of the bolts 84 are designed to engage small recesses 88 in the outer surface 90 of the outer pinch plate 64 such that threading of the bolts 84 into the reaction plate 82 will force the outer pinch plate 64 toward the inner pinch plate 62 to sandwich the everted portion 24 of the liner 20 in between.

Similar to the outer pinch plate 64, the inner periphery of the reaction plate 82 includes a series of grooves 92 that are adapted to receive the splines 78 on the connector stud 60 to facilitate axial movement of the reaction plate 82 relative to the connector stud 60. The connector stud 60 further includes an annular groove 94 having a thickness sufficient to allow rotation of the reaction plate 82 relative to the connector stud 60 when the reaction plate 82 is aligned with the annular groove 94. In order to couple the reaction plate 82 to the connector stud 60, the reaction plate 82 is slid onto the end of the connector stud 60 until the reaction plate 82 is aligned with the annular groove 94, and then the reaction plate 82 is rotated until the grooves 92 of the reaction plate 82 are misaligned with the splines 78 on the connector stud 60 to thereby inhibit axial movement of the reaction plate 82 relative to the connector stud 60. In this way, the reaction plate 82 provides an axially-stable structure against which the bolts 84 will apply a reaction force when forcing the outer pinch plate 64 toward the inner pinch plate 62.

The pressure connector 22 further includes a skirt 95 secured to the inner pinch plate 62. The skirt 95 is designed to direct pressurized fluid as it enters the liner 20 through the connector stud 60. The skirt 95 includes an oblique wall 96 positioned in alignment with the axis of the connector stud 60 to thereby deflect fluid entering through the connector stud 60. The skirt 95 further includes a parallel portion 98 that is an extension of the oblique wall 96 and is substantially parallel to the inner pinch plate 62, and sidewalls 99. The skirt 95 is designed to direct the pressurized fluid away from the open end of the liner 20 and toward the portion of the liner 20 that is being everted (i.e., at the transition between the non-everted portion 26 of the liner 20 and the everted portion 24 of the liner 20.)

The above-described structure is secured to the liner 20 as follows. First, the liner 20 is fed through the support structure 18, and the open end 23 of the liner 20 is everted outwardly to create the everted portion 24 separate from the non-everted portion 26. At the open end 23, the inner layer 44 is separated from the outer layer(s) 46 at two opposing locations to create two opposing voids 50. An opening is created through the outer layer(s) 46 at each of the opposing locations. A stretch member 32 is then positioned in each void 50, and the engagement portion 36 of each stretch member 32 is inserted through the corresponding opening 52 in the outer layers 46. The chains 38 are then secured to each engagement portions 36, and force is applied to at least one of the chains 38 to force the stretch members 32 away from each other to stretch the everted portion 24 of the liner 20. The pinchers 40 can then be brought toward each other to compress the sidewalls of the liner 20 to achieve the desired compression on the liner 20.

Another opening 68 is created in the sidewall of the everted portion 24 of the liner 20. The connector stud 60 and inner pinch plate 62 are then positioned adjacent the inner surface 70 of the everted portion 24 of the liner 20, and the connector stud 60 is inserted through the opening in the liner 20 until the inner pinch plate 62 is contacting the inner surface 70 of the everted portion 24 of the liner 20. The outer pinch plate 64 is then slid onto the connector stud 60 in a rotational orientation that is aligned with the inner pinch plate 62. The reaction plate 82 is then slid onto the connector stud 60 until it is aligned with the annular groove 94. The reaction plate 82 is then rotated to a point where the reaction plate 82 is prevented from moving axially relative to the connector stud 60. The bolts 84 can then be threaded through the reaction plate 82 until the ends of the bolts 84 contact the outer pinch plate 64. Further threading of the bolts 84 into the reaction plate 82 will force the outer pinch plate 64 toward the inner pinch plate 62 to squeeze the sidewall of the everted portion 24 of the liner 20 between the pinch plates 62,64. The circumferential ridges 73,81 of the inner and outer pinch plates 62,64 will dig into the sidewall of the liner 20 to create a sealed engagement between the pressure connector 22 and the liner 20.

Various features and advantages of the invention are set forth in the following claims.

What is claimed is:

1. A method of everting a liner into a pipe comprising:
    flipping an open end of the liner inside out to create an everted portion;
    engaging a sidewall of the liner at two opposing locations on the everted portion; and
    applying a force at the two opposing locations to stretch the everted portion of the liner into a flattened position,
    wherein engaging a sidewall includes positioning a stretch member at least partially inside the sidewall of the everted portion at each of the two opposing locations, and
    wherein applying a force includes moving the two stretch members away from each other.

2. The method of claim 1, wherein positioning a stretch member includes:
    creating a void between an inner layer of the everted portion and an outer layer of the everted portion at each of the two opposing locations; and
    inserting at least a portion of each stretch member in the corresponding void.

3. The method of claim 1, wherein positioning a stretch member includes:
    forming an opening at least partially through the sidewall of the liner at each of the two opposing locations; and
    inserting at least a portion of each stretch member through the corresponding opening.

4. The method of claim 1, wherein the everted portion includes two opposing mid-point locations substantially between the opposing locations, and wherein the method further comprises holding the mid-point locations away from each other.

5. The method of claim 4, wherein holding includes positioning a stretch member into the liner at each of the two opposing locations, the stretch member having a lateral dimension sufficient to inhibit contact between the mid-point locations.

6. The method of claim 5, wherein each stretch member includes a frustocylindrical portion, and wherein positioning a stretch member includes inserting the frustocylindrical portion into the liner at each of the two opposing locations.

7. The method of claim 6, wherein inserting includes:
    creating a void between an inner layer of the everted portion and an outer layer of the everted portion at each of the two opposing locations; and
    inserting the frustoconical portion of each stretch member in the corresponding void.

8. A method of everting a liner into a pipe comprising:
    flipping an open end of the liner inside out to create an everted portion;
    engaging a sidewall of the liner at two opposing locations on the everted portion; and
    applying a force at the two opposing locations to stretch the everted portion of the liner,
    wherein engaging a sidewall includes positioning a stretch member at least partially inside the sidewall of the everted portion at each of the two opposing locations, and
    wherein applying a force includes moving the two stretch members away from each other.

9. The method of claim 8, wherein positioning a stretch member includes:
    creating a void between an inner layer of the everted portion and an outer layer of the everted portion at each of the two opposing locations; and
    inserting at least a portion of each stretch member in the corresponding void.

10. The method of claim 8, wherein positioning a stretch member includes:
    forming an opening at least partially through the sidewall of the liner at each of the two opposing locations; and
    inserting at least a portion of each stretch member through the corresponding opening.

11. The method of claim 8, wherein the everted portion includes two opposing mid-point locations substantially between the opposing locations, and wherein the method further comprises holding the mid-point locations away from each other.

12. The method of claim 11, wherein holding includes positioning the stretch member into the liner at each of the two opposing locations, the stretch member having a lateral dimension sufficient to inhibit contact between the mid-point locations.

13. The method of claim 12, wherein each stretch member includes a frustocylindrical portion, and wherein positioning a stretch member includes inserting the frustocylindrical portion into the liner at each of the two opposing locations.

14. The method of claim 13, wherein inserting includes:
    creating a void between an inner layer of the everted portion and an outer layer of the everted portion at each of the two opposing locations; and
    inserting the frustoconical portion of each stretch member in the corresponding void.

15. A method of everting a liner into a pipe comprising:
    flipping an open end of the liner inside out to create an everted portion;
    engaging a sidewall of the liner at two opposing locations on the everted portion; and
    applying a force at the two opposing locations to stretch the everted portion of the liner into a flattened position,
    wherein engaging a sidewall includes positioning a stretch member at least partially inside the sidewall of the everted portion at each of the two opposing locations,
    wherein positioning a stretch member includes, forming an opening at least partially through the sidewall of the liner at each of the two opposing locations; and
    inserting at least a portion of each stretch member through the corresponding opening.

16. The method of claim 15, wherein applying a force includes moving the two stretch members away from each other.

17. The method of claim 15, wherein positioning a stretch member includes:
   creating a void between an inner layer of the everted portion and an outer layer of the everted portion at each of the two opposing locations; and
   inserting at least a portion of each stretch member in the corresponding void.

18. The method of claim 15, wherein the everted portion includes two opposing mid-point locations substantially between the opposing locations, and wherein the method further comprises holding the mid-point locations away from each other.

19. The method of claim 15, wherein each stretch member includes a frustocylindrical portion, and wherein positioning a stretch member includes inserting the frustocylindrical portion into the liner at each of the two opposing locations.

* * * * *